US012567056B2

(12) United States Patent
    Jeanne et al.

(10) Patent No.: US 12,567,056 B2
(45) Date of Patent: Mar. 3, 2026

(54) SECURING TRANSACTIONS

(71) Applicant: ORANGE, Issy-les-Moulineaux (FR)

(72) Inventors: Fabrice Jeanne, Chatillon Cedex (FR);
    Patrick Leroy, Chatillon Cedex (FR);
    Christopher Georget, Chatillon Cedex
    (FR)

(73) Assignee: ORANGE, Issy-les-Moulineaux (FR)

( * ) Notice: Subject to any disclaimer, the term of this
    patent is extended or adjusted under 35
    U.S.C. 154(b) by 0 days.

(21) Appl. No.: 16/470,825

(22) PCT Filed: Dec. 13, 2017

(86) PCT No.: PCT/FR2017/053542
    § 371 (c)(1),
    (2) Date: Jun. 18, 2019

(87) PCT Pub. No.: WO2018/115641
    PCT Pub. Date: Jun. 28, 2018

(65) Prior Publication Data
    US 2019/0311349 A1     Oct. 10, 2019

(30) Foreign Application Priority Data
    Dec. 19, 2016    (FR) ...................................... 1662729

(51) Int. Cl.
    *G06Q 20/32*        (2012.01)
    *G06Q 20/02*        (2012.01)
    (Continued)

(52) U.S. Cl.
    CPC ......... *G06Q 20/3223* (2013.01); *G06Q 20/02*
    (2013.01); *G06Q 20/102* (2013.01);
    (Continued)

(58) Field of Classification Search
    CPC ..... G06Q 20/3223; G06Q 20/40; G06Q 40/00
    See application file for complete search history.

(56) References Cited

U.S. PATENT DOCUMENTS

2009/0064266 A1* 3/2009 Wollmershauser .... H04N 21/64
                                                725/116

FOREIGN PATENT DOCUMENTS

JP        2005107849 A     4/2005

OTHER PUBLICATIONS

International Search Report dated Feb. 12, 2018 for corresponding
International Application No. PCT/FR2017/053542, filed Dec. 13,
2017.
(Continued)

*Primary Examiner* — Ojo O Oyebisi
(74) *Attorney, Agent, or Firm* — David D. Brush;
Westman, Champlin & Koehler, P.A.

(57) ABSTRACT

A method for securing a transaction between a terminal, in
particular of a first user, and a device, in particular of a
second user, via a server, in particular of a third-party entity.
The method includes comparing: a first series of codes
drawn from a private key and associated with the transaction
device transmitted from the server to the transaction device,
and a second series of codes received by the server from a
terminal, in particular of the first user. The comparison
triggers in case of a match between the two series of codes,
associating the second terminal, the transaction device and
the transaction, making it possible to issue an authorization
to continue the transaction between the second terminal and
the transaction device associated by the server.

5 Claims, 2 Drawing Sheets

(51) Int. Cl.
   *G06Q 20/10*        (2012.01)
   *G06Q 20/12*        (2012.01)
   *G06Q 20/38*        (2012.01)
   *G06Q 20/40*        (2012.01)

(52) U.S. Cl.
   CPC ........... *G06Q 20/12* (2013.01); *G06Q 20/327* (2013.01); *G06Q 20/3272* (2013.01); *G06Q 20/3274* (2013.01); *G06Q 20/382* (2013.01); *G06Q 20/385* (2013.01); *G06Q 20/40* (2013.01)

(56)                    References Cited

OTHER PUBLICATIONS

Written Opinion of the International Searching Authority dated Feb. 12, 2018 for corresponding International Application No. PCT/FR2017/053542, filed Dec. 13, 2017.
English translation of the Written Opinion of the International Searching Authority dated Feb. 12, 2018 for corresponding International Application No. PCT/FR2017/053542, filed Dec. 13, 2017.

* cited by examiner

SECURING TRANSACTIONS

CROSS-REFERENCE TO RELATED APPLICATIONS

This application is a Section 371 National Stage Application of International Application No. PCT/FR2017/053542, filed Dec. 13, 2017, the content of which is incorporated herein by reference in its entirety, and published as WO 2018/115641 on Jun. 28, 2018, not in English.

FIELD OF THE DISCLOSURE

The invention relates to the field of the security of the exchanges of data during transactions.

BACKGROUND

In order to reinforce security, it is known practice to increase the number of checks in remote transactions. For example, a client wanting to pay online for an order to a merchant may have to enter a single-use code, or OTP, for "One Time Password", to confirm a transaction. Generally, such OTPs have a short validity time, of the order of a few minutes, and become obsolete after a single use. The OTPs are transmitted by an intermediary, often the banking organization of the client, by means of a text message on a telephone of the client, or SMS, for "Short Message Service".

The use of OTPs makes it possible to relieve the client of having to enter a code permanently linked to his or her payment means, for example a code of PIN ("Personal Identification Number") type of a chip card or a cryptogram inscribed on a payment card. Thus, even if a third party or the merchant itself has access to the data transmitted, the latter are insufficient to use the payment means.

However, the sending of an OTP to the client is triggered only on reception of a request from the merchant to the intermediary. To be established, such a request requires the client to first supply the merchant with sensitive data such as the identity of his or her banking organization, an identifier of the payment means, a surname, a first name, etc. In addition to the banking information, the client often has to provide other sensitive data such as personal data: physical delivery address, postal billing address, e-mail, telephone numbers, delivery information such as entry codes, times of presence in the home, etc.

The use of an OTP does not safeguard against the interception of most of the sensitive data generally supplied during a transaction.

In particular, when the client uses a computer or an unsecured connection to enter his or her order, the protection of the sensitive data cannot be assured.

SUMMARY OF THE DISCLOSURE

The invention aims to improve the situation.

The applicant proposes a method for securing a transaction initialized between a first available communication terminal and a transaction device via a server. The method comprises:
comparing:
- a first series of codes transmitted with a first data stream associated with the transaction, from the server to the transaction device, the data of the first stream comprising the first series of codes drawn from a private key associated with the transaction device, and

- a second series of codes received with a second data stream by the server from a second communication terminal, said second terminal transmitting the second stream in response to the reception of the first stream,
the comparison triggering, in case of a match between the two series of codes, associating the second terminal, the second user and the transaction, making it possible to issue an authorization to continue the transaction between the second terminal and the transaction device associated by the server.

Such a method allows a first user to begin a transaction with the transaction device, for example an order for an object to be delivered, on the first terminal. The first terminal and/or a part of the network used may not be secured, be badly secured or have a level of security that is unknown to the first user. The user may nevertheless prefer to use a computer in an Internet café for better browsing comfort rather than use a smartphone whose screen is smaller ("smartphone" is used here in the sense of "computer phone"). Thus, the smartphone can be used as second terminal. There is then no need for the user to enter the sensitive data, in particular the banking and personal data, on the first terminal. In other words, the transaction is possible without the sensitive data passing through the first terminal or a portion of a network whose security is unknown.

According to another aspect, the applicant proposes a server for securing a transaction initialized between a first communication terminal and a transaction device, the server being able to communicate with a second communication terminal and with the transaction device, the server comprising:
a comparator:
- of a first series of codes transmitted with a first data stream associated with the transaction, by a transmitter of the server to the transaction device, the data of the first stream comprising the first series of codes drawn from a private key associated with the second user, and
- of a second series of codes received with a second data stream by a receiver of the server from a second communication terminal, said second terminal transmitting the second stream in response to the reception of the first stream,
the comparator being able, in case of a match between the two series of codes, to associate the second terminal, the transaction device and the transaction, triggering
a device for authorizing the continuation of the transaction between the associated second terminal and transaction device, via the server.

According to another aspect, the applicant proposes a method for validating a transaction initialized between a first communication terminal and a transaction device, implemented by a second communication terminal. The method comprises: inserting, into a second data stream, a second series of codes in response to a reception of a first series of codes associated with the transaction by the transaction device in a first data stream originating from a server, the second series of codes being drawn from a private key associated with the transaction device, the second stream being able to be transmitted from the second terminal to the server.

According to another aspect, the applicant proposes a communication terminal capable of communicating with a server and comprising a validation device. The validation device comprises: a stream generator inserting, into a second data stream, a second series of codes in response to a reception of a first series of codes associated with the transaction by the transaction device in a first data stream originating from a server, the second series of codes being drawn from a private key associated with the transaction device, the second stream being able to be transmitted by a transmitter of the second terminal to the server.

According to another aspect, the applicant proposes a computer program comprising instructions for implementing one and/or the other of the methods when this program is run by a processor.

The following features can, optionally, be implemented. They can be implemented independently of one another or in combination with one another:

The first stream is transmitted continuously in response to a request from the transaction device addressed to the server, and is stopped on closure of the transaction. The continuous transmission of the first stream containing the first series of codes makes it possible to repeat the comparison until an adequate level of match is detected between a transmitted first series and a received second series.

The first series of codes of the first stream takes the form of a multimedia content. Thus, if the second terminal is provided with a sensor, there will be no need to connect the first terminal 11 and the second terminal 12 to one another via a physical or wireless connection for a first user having the first terminal and the second terminal, reading the first series of codes received, to enter on his or her second terminal a second series of codes which will be transmitted in a second stream.

The comparison of the first series of codes and of the second series of codes comprise: checking that the level of match of the second series with the first series is above a match threshold value that is predefined and lower than 100%. This makes it possible to identify a match between the first and the second series of codes despite transmission errors that may occur between the transmission of the first stream to the transaction device and the reception of the second stream from the second terminal.

The first stream and/or the second stream are each transmitted via a secured channel, respectively between the server and the transaction device, respectively between the second terminal and the server. This additional precaution makes it possible to complicate the efforts of a malicious third party. By sufficiently slowing down the interception and the interpretation of the exchanges by such a third party, it becomes probable that the transaction will be closed before the third party can use the intercepted data. Now, upon the closure of the transaction, the exchanged data become unusable.

The authorization to continue the transaction comprises:
sending a transaction confirmation request to the second terminal from the server,
receiving a confirmation of the transaction on the server from the second terminal,
sending a confirmation of the transaction to the transaction device from the server.

This makes it possible, for example, to avoid transmitting banking data specific to the first user of the first and second terminals, to the transaction device. The possible consequences for the first user of poorly secured stored data and/or data exchanged by the transaction device are limited.

The second stream comprises capture data of a multimedia content via at least one sensor of the second terminal, the second series of codes being included in the capture data of the multimedia content. Thus, if the first terminal receives the first series of codes in a multimedia content that it reproduces, there will be no need to connect the first terminal and the second terminal to one another via a physical or wireless connection for a first user reading the first series of codes received on his or her first terminal to enter on his or her second terminal a second series of codes which will be transmitted in a second stream.

The validation method further comprises: capturing a multimedia content contained in the first stream, received by the first terminal from the transaction device, and reproduced by the first terminal, the capture being performed via at least one sensor of the second terminal, the multimedia content including the first series of codes. Thus, if the first terminal receives the first series of codes in a multimedia content that it reproduces, there will be no need to connect the first terminal and the second terminal to one another via a physical or wireless connection for a first user reading the first series of codes received on his or her first terminal to enter on his or her second terminal a second series of codes which will be transmitted in a second stream.

The capture of the multimedia content reproduced by the first terminal comprises at least one of the following operations:
photographing and/or filming, by means of an optical sensor of the second terminal, a display screen of the first terminal displaying a succession of fixed or moving images, or a video;
picking up, by means of a microphone of the second terminal, sound emitted by a loudspeaker of the first terminal.

Optical sensors and microphones are generally present on the known devices available to the users, in particular smartphones. There is then no need for the first user to acquire a terminal or dedicated equipment.

The validation method further comprises, between the capture of the multimedia content and the transmission of the at least one part of the first series of codes, an operation of decryption of the codes contained in the multimedia content captured by the second terminal, the second stream that can be transmitted comprising the second series of codes in decrypted form and drawn from the captured multimedia content. The quantity of data to be transmitted from the second terminal is then reduced.

BRIEF DESCRIPTION OF THE DRAWINGS

Other features, details and advantages of the invention will become apparent on reading the following detailed description, and on analyzing the attached drawings, in which.

DETAILED DESCRIPTION OF EXEMPLARY EMBODIMENTS

The drawings and the description hereinbelow contain, for the most part, elements of a certain nature. They will therefore not only serve to better convey an understanding of the present invention, but also contribute to its definition, as appropriate.

In the following detailed description of embodiments of the invention, many specific details are presented to provide a more comprehensive understanding. Nevertheless, the person skilled in the art may realize that embodiments can be put into practice without these specific details. In other cases, features that are well known are not described in detail to avoid unnecessarily complicating the description.

"Network" is understood here to mean one or more links allowing data to be transported between computer systems, terminals and/or all kinds of electronic or computer equipment.

Figure 1:
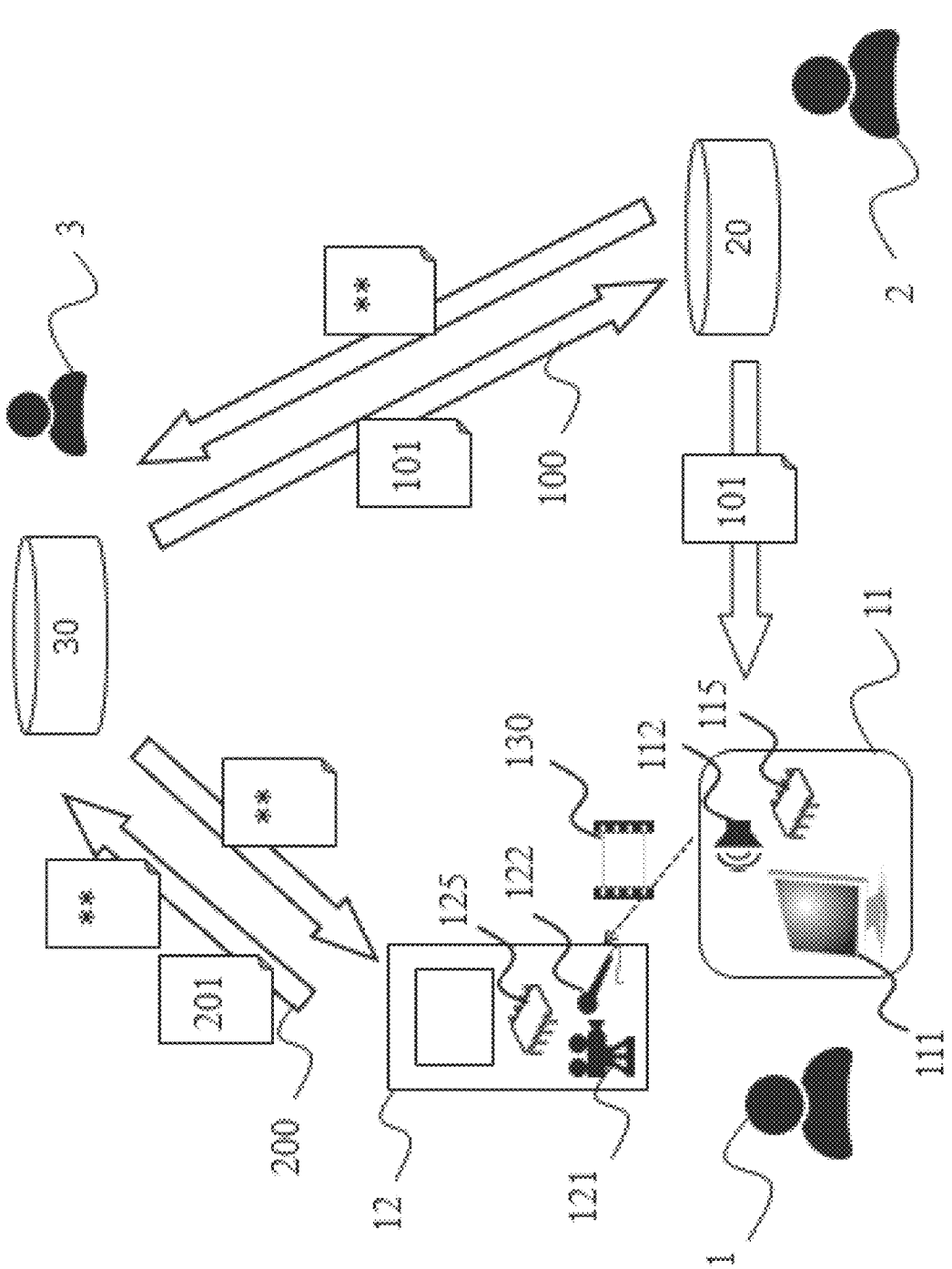
FIG. 1 shows a system for implementing a method according to one or more embodiments of the invention.

FIG. 1 represents interactions between three distinct entities that are generally remote from one another: a client system 11, 12, a transaction device 20 and a server 30. In particular, a first user 1 has the client system 11-12 composed of a first communication terminal 11 and of a second communication terminal 12. Possibly, a second user 2 has the unit 20, also called transaction device. Also, in particular, a third-party entity 3 has a server 30. In a misuse of language, the three distinct entities are the first user 1, the second user 2 and the third-party entity 3.

The system comprises the following elements: the terminals 11, 12, the unit 20 and the server 30. The abovementioned elements implement respective methods. The methods can therefore for the most part be implemented by computer means. In the interests of consistency and of clarity, the methods are then described as a whole in order to better learn how the elements interact in operation. The person skilled in the art will understand that the quite distinct elements above are designed to operate together and have links between them. The same applies for the method aspects of the invention.

In the example of application provided here, the first user 1 is a person wanting to buy an item via the Internet and have it delivered to the home. The second user 2 is a merchant managing a point of sale, for example via a commercial website, and wants to sell an item to the first user 1. The third-party entity 3 is distinct from the first user 1 and from the second user 2. The third-party entity 3 acts as trusted third party between the first user 1 and the second user 2. The third-party entity 3 can, for example, be a bank. In the present context, the term "bank" is understood in the general sense of commercial and/or financial intermediary and should not be likened to a particular legal or regulatory status.

In the context of the invention, the first terminal 11 denotes a terminal through which the first user 1 does not want data that he or she considers sensitive to pass, for example when he or she has doubt as to how well the data which are entered therein are secured. For example, the first terminal 11 may be lent to the first user 1 or be connected to a network of the public Wi-Fi type in which the first user 1 does not control the security characteristics. The second terminal 12 denotes, on the other hand, a trusted terminal for the first user 1. For example, the second terminal 12 can be a telephone or a personal computer of the first user 1 and be linked to a trusted network. The term "trusted" is understood here in its relative sense by comparison with the first terminal 11, it being understood that no connected terminal can ensure absolute security of the data which are entered therein.

In an example illustrated by FIG. 1, the first terminal 11 is a computer whereas the second terminal 12 is a smartphone ("smartphone" being here equivalent to "computer phone", or "smart telephone"). In a variant, the terminals 1, 2 are of another type.

The first terminal 11 comprises communication means, also called transmitter of transactions, capable of connecting the first terminal 11 with the unit 20, for example, via the Internet network. The communication means involve data packet transfer protocols (such as the IP (Internet Protocol) for example).

The first terminal 11 further comprises several input/output interfaces, such as a graphical interface including a screen 111, and a loudspeaker 112. The input/output interfaces can be incorporated in the first terminal 1 or be remote, for example by means of peripheral devices linked to the first terminal 11.

The second terminal 12 comprises communication means capable of connecting the second terminal 12 with the server 30, for example via the Internet network. The communication means involve data packet transfer protocols. The second terminal 12 further comprises communication means compatible with a telecommunication network of the cellphone type, for example GSM, GPRS, EDGE, 3G, 4G or LTE compatible. Other means can be envisaged. The second terminal 12 also comprises input/output interfaces, here sensors, for example an optical sensor 121 and a microphone 122.

The input/output interfaces can be incorporated in the second terminal 12 or be remote, for example by means of devices communicating with the second terminal 12.

Each of the first terminal 11 and of the second terminal 12 includes several devices, or units, including, respectively, a transaction interface 115 and a validation device 125, each including one or more processors which control the operations of the first terminal 11, respectively of the second terminal 12, such as a central processing unit (CPU) or another hardware processor, and an associated memory (for example, a random access memory (RAM), a read-only memory (ROM), a cache memory and/or a flash memory, or any other storage medium capable of storing software code in the form of instructions that can be executed by a processor or data structures that can be accessed by a processor) coupled operationally to the processor(s).

Each of the first terminal 11 and of the second terminal 12 includes an operating system and programs, components, modules, applications in the form of a software executed by the processor(s), which can, in one or more embodiments, be stored in a non-volatile memory.

The person skilled in the art may realize that even though the proposed system is described in its different embodiments with the first terminal 1 of computer type and the second terminal 12 of smartphone type, different embodiments of the proposed system can be implemented by using different combinations of types of communication terminals, in particular including tablets.

The unit 20 and the server 30 each include one or more processors, such as a central processing unit (CPU) or another hardware processor, and an associated memory (for example, a random access memory (RAM), a read-only memory (ROM), a cache memory and/or a flash memory, or any other storage medium capable of storing software code in the form of instructions that can be executed by a processor or data structures that can be accessed by a processor) coupled operationally to the processor(s). The unit 20 and the server 30 each include an operating system and programs, components, modules, applications in the form of software executed by the processor(s), which can, in one or more embodiments, be stored in a non-volatile memory.

The unit 20 comprises means of communication with the server 30 of the third-party entity 3 on the one hand and with the first terminal 11 on the other hand. Thus, the server 30 comprises a transmitter allowing the transmission of the first stream 100 between the server 30. The unit 20 comprises a first transmitter capable of receiving the first stream 100 from the transmitter of the server 30. The unit 20 further comprises a second transmitter, called transmitter of transactions, allowing the exchanges between the unit 20 and the first terminal 11. Thus, the first stream 100 will be received from the server 30 by the first transmitter of the unit 20 then, possibly, transmitted by the second transmitter of the unit to the first terminal 11.

The unit 20 comprises a part in the background (or "back-end") including the processor(s) and the means of communication with the server 30 of the third-party entity 3. The unit 20 comprises a front-end part (or "front-end"). The front-end part includes, here, a website that can be accessed via the Internet by the first user 1, that is to say a user interface.

The server 30 comprises means of communication with the second terminal 12 of the first user 1 on the one hand and with the unit 20 of the second user 2 on the other hand. Thus, the server 30 comprises a receiver that can wait for the reception of data from the second terminal 12 of the first user 1 (in particular the second stream 200 of document after), and a transmitter capable of transmitting data to the second terminal 12, the transmitter being able to be distinct from or common to the transmitter mentioned above.

In the example described here, the communication channels between the server 30 of the third-party entity 3 and the second terminal 12 of the first user 1, as well as the communication channels between the server 30 (or first transmitter) of the third-party entity 3 and the back-end part of the unit 20 of the second user 2, are secured.

In a particular embodiment, the transaction device 20 comprises a comparator of series of codes comparing a first series of codes transmitted in a first stream of the transaction device from a server, in particular of the third-party entity, to a second series of codes received in a second stream received from a second terminal, in particular of the first user. The transaction device 20 comprises, in particular, a first transmitter transmitting the first stream to the server, in particular of the third-party entity, and/or a receiver receiving the second stream. The transaction device 20 comprises, in particular, an authorization device authorizing the continuation of the transaction between the second terminal and the transaction device via the server, that is to say, in particular, the continuation of the transaction between the first user and the second user via the third-party entity. Possibly, the transaction device 20 comprises a user interface allowing the first user by means of his or her first terminal to initialize a transaction with the second user, such as a website. In this particular embodiment, by comparison to the embodiments described hereinbelow, the comparison of the codes and/or the authorization are performed by the transaction device 20 rather than by the server 30, in particular of the third-party entity 3.

Figure 2:
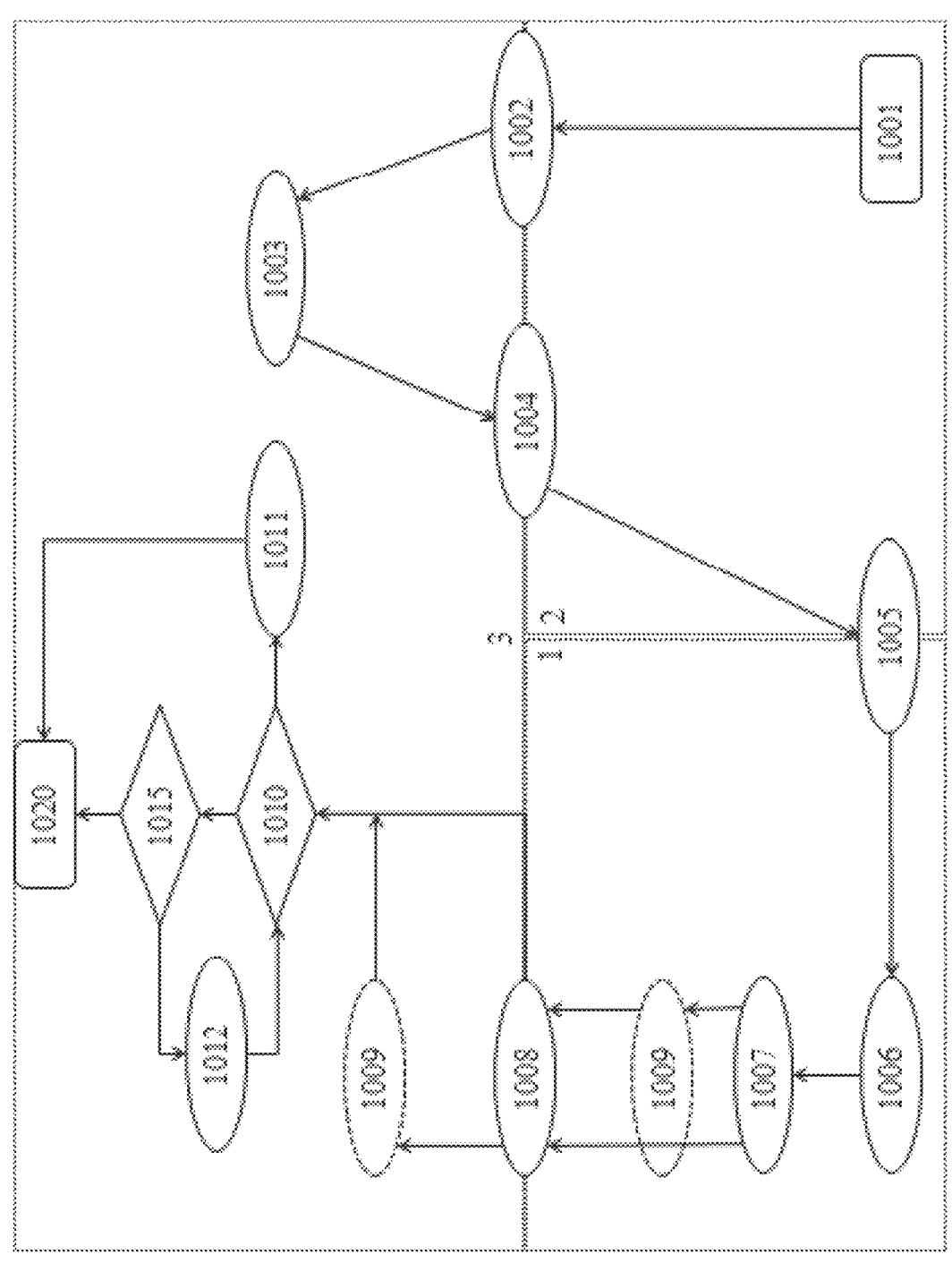
FIG. 2 shows a diagram illustrating a set of proposed methods according to one or more embodiments of the invention.

Referring to FIG. 2, the methods begin when a transaction has previously been started. For example, the first user 1, as client of the transaction device 20, in particular of the second user 2, selects on the website a set of one or more items that he or she wants to acquire. This set, usually called "basket", comprises a set of information considered as non-sensitive. For example, item identifiers, item quantities, availability dates, possible delivery dates and/or item prices. Here, the basket comprises no banking or personal information relating to the first user 1. In other words, at this stage, the first user 1 is not identified and is substantially anonymous from the point of view of the unit 20 and of the second user 2. No sensitive datum has passed through the first terminal 11 and the communication channels linking the first terminal 11 to the unit 20, which are potentially unsecured.

In a variant, the first user 1 can agree to transmit personal data, for example by identifying him or herself with the website of the transaction device 20, in particular of the second user 2. This can, for example, allow the unit 20, in particular of the second user 2, to adapt to the first user 1 by adapting the browsing on the website to pre-stored preferences or by suggesting items according to preferences of the first user 1. In this case, some personal data such as an identifier and a password can be entered on the first terminal 11. Nevertheless, the banking data of the first user 1 are not entered therein.

When the basket is validated, that is to say that the first user 1 indicates that he or she now wants to pay for his or her purchases, the transaction is begun. This initial state corresponds to the operation referenced 1001 in FIG. 2. In the example of application proposed here, the operation 1001 is implemented upon validation of the basket. As a variant, the transaction device 20, in particular of the second user 2, can propose to a first terminal 11, in particular of the first user 1, the implementation of the system according to the invention as a choice among other transaction methods, for example methods known in themselves. Thus, the first user 1 can choose the level of security of his or her data, for example according to his or her trust in the first terminal 11. In the case of a possible choice in the transaction methods, the operation 1001 is implemented when the first user 1 chooses a method according to the invention.

The transaction is initialized by the operation 1001.

In an operation 1002, the unit 20 transmits to the server 30 a request comprising an identifier of the initialized transaction and an identifier of the unit 20. The identifier of the unit 20 can be incorporated in the identifier of the transaction, for example by means of a unique transaction number, a portion of which corresponds to an identifier of the unit 20. The identifier of the transaction makes it possible in particular to thereafter distinguish two simultaneous transactions from one and the same unit 20.

The request can also be accompanied by the supply of data relating to the current transaction, for example the price to be paid. In this case, the server 30 stores the data relating to the current transaction in order to call them subsequently to confirm or deny the transaction. As a variant, the data relating to the current transaction can be transmitted from the unit 20 to the server 30 in the course of a subsequent operation.

The request can also comprise a list of types of data that the transaction device 20 requires, in particular that the second user 2 wants to obtain. Such a list can comprise a classification of the types of data required. For example, the obtaining by the transaction device 20, in particular the second user 2, of a delivery address can be classified as an essential type of data, that is to say without which the unit 20 will not confirm the transaction. In the case where a delivery address is not obtained, the transaction cannot be completed. On the other hand, the obtaining of a telephone number of the first user 1 can be classified as optional. As a variant, the request does not include any list of desired data. Such a list can be established generally for any transaction, for example when the transaction device, in particular of the second user 2, subscribes to the services of the server 30, in particular of the third-party entity 3, or subsequently when the transaction is being checked. Such a list can also not be established.

In an operation 1003, the server 30 generates a first series of codes 101 specific to the transaction. The server 30 therefore comprises a code generator.

In the example described here, the first series 101, or sequence, of codes is generated for each transaction. The code generator is a pseudo-random number generator (or PRNG). The generator implements an algorithm that can generate dynamic codes from a seed specific to each transaction device 20, in particular to each second user 2. The seed is drawn from a private key of the transaction device 20, in particular a private key of the second user 2. The code generator can generate a quasi-infinite and substantially continuous number composed of a series of codes. Thus, the series of codes can also be seen as a dynamic code. The series of codes can for example be generated substantially continuously throughout the duration of the transaction.

Thus, the operation 1003 of generation of series of codes begins on reception of the request from the unit 20 and can continue until the end of the transaction and concurrently with the operations described hereinbelow.

Generating a series of codes continuously, or a dynamic code, makes it possible to increase the complexity of the decoding by a malicious third party. Now, the code becomes useless at the end of the transaction. It is therefore sufficient for the code to remain indecipherable for the duration of the transaction.

As a variant, other types of code generators can be implemented to generate a first series of codes 101.

In an operation 1004, the server 30 transmits to the unit 20 the first series of codes 101. Here, the first series 101 is transmitted in a first data stream 100 transmitted from the server 30 to the unit 20. The first stream 100 passes through a secured channel between the server 30 and the unit 20. The first stream 100 is substantially continuous (in "streaming" form) until the end of the transaction, excluding defects and errors in the communication between the server 30 and the unit 20. In other words, depending on the quality of the communication, parts of the first series 101 may be missing on reception by the unit 20.

The first series 101 is also stored by the server 30. The first series 101 is saved in association with data identifying the transaction.

In an operation 1005, the unit 20 transmits to the first terminal 11 the first stream 100 received from the unit 20, including the first series 101. In other words, the unit 20 serves as relay between the server 30 and the first terminal 11. The first stream 100 is also substantially continuous between the server 30 and the unit 20. Defects and errors in the communication between the server 30 and the unit 20 and between the unit 20 and the first terminal 11 may lead to losses between the first series 101 generated by the server 3 and the first series 101 received by the first terminal 11. Such losses can be considered negligible. Nevertheless, the possibility of such losses will be taken into account hereinbelow.

In an operation 1006, on reception of the first stream 100 by the first terminal 11, the first terminal 11 is arranged to broadcast a multimedia content 130 including at least a part of the first series of codes 101. The multimedia content 130 can comprise, for example, sound, fixed images, moving images, videos or a combination of such media. In the example described here, the multimedia content 130 is broadcast via the screen 111 and/or the loudspeaker 112 of the first terminal 11.

In the example described here, the first series 101 is encoded as a multimedia content 130 by the server 30 itself after the generation of the codes and before transmission to the unit 20. Thus, the first series 101 is present in the form of multimedia content 130 from the time of its transmission to the unit 20, in particular of the second user 2, in the first stream 100. The multimedia content 130 is broadcast in streaming mode by the server 30 to the first terminal 11 via the unit 20. As a variant, the first series 101 can be encoded as a multimedia content 130 a posteriori, for example by the unit 20 before being transmitted to the first terminal 11.

In a step 1007, the multimedia content 130 broadcast by the first terminal 11 is captured by the second terminal 12. In the example described here, the capture comprises:

photographing and/or filming, by means of the optical sensor 121 of the second terminal 12, the display screen 111 of the first terminal 11 displaying a succession of fixed or moving images, or a video, and/or picking up, by means of the microphone 122 of the second terminal 12, sound emitted by the loudspeaker 112 of the first terminal 11.

The sensors of the second terminal 12 made to contribute are chosen to be compatible with the type of multimedia content 130 (sounds, fixed images, moving images, videos or a combination of the preceding forms).

In the exemplary application described hereinabove, the first user 1 uses his or her smartphone 12 to pick up content broadcast by the computer of the Internet café.

Optionally, the multimedia content 130 picked up by the second terminal 12 is stored at least temporarily in a memory of the terminal 12, for example a buffer memory.

In an operation 1008, the second terminal 12 transmits to the server 30, in particular of the third-party entity 3, a second data stream 200. The second terminal 12 comprises a transmitter that can transmit, from the terminal 12 to the server 30, the second stream 200. The transmission can be performed continuously (streaming mode). The second data stream 200 comprises a second series of codes 201. The second series of codes 201 is drawn from the multimedia content 130 as picked up by the second terminal 12. The second series of codes 201 comprises at least partially the first series of codes 101. The differences between the first series 101 and the second series 201 correspond to the successive losses of information, namely, here, the losses of information due to the communication faults between the server 30 and the unit 20, to the communication faults between the unit 20 and the first terminal 11 and to the loss of information due to the passage of the multimedia content 130 from the first terminal 11 to the second terminal 12 by broadcast-capture. The second series 201 can therefore be seen as a part of a series of codes drawn from the multimedia content 130 picked up by the sensors 121 and/or 122, and validated by the validation device 125 of the second terminal 12. The validation device 125 comprises a stream generator inserting, into the second data stream 200, the second series of codes 201 in response to the reception of the first series 101.

In effect, the transmission of the data by broadcast and capture of a multimedia content can generate a substantial loss of information. Nevertheless, there is no need to connect the first terminal 11 and the second terminal 12 to one another via a physical or wireless connection. The first user 1 can thus check that the first terminal 11 and the second terminal 12 do not communicate by computing means. The risk for the security of the second terminal 12 and that of the data to which access is possible via the second terminal 12 is thus reduced. The second terminal 12 does not transmit any information to the first terminal 11. The transmission by broadcast-capture is one-way. Furthermore, the transmission by transmission-capture of a multimedia content requires components and software that are generally available on the usual terminals (loudspeaker, screen, microphone, optical sensor and corresponding software). The risks of incompatibility between the first terminal 11 and the second terminal 12, in particular the connection means, are also reduced.

In an operation 1009, the second series of codes 201 is extracted from the multimedia content 130. In other words, the multimedia content 130 is decrypted, totally or partially, so as to obtain the second series of codes 201.

In some embodiments, the operation 1009 is implemented, at least partly, by the second terminal 12, before the implementation of the operation 1008, i.e. before the transmission of the second series 201 to the server 30. In this case at least, the second terminal 12 is equipped with a decryption module, also called decryption device or decryptor. The decryptor can take the form of an application or of software installed on the second terminal 12. Such a decryptor can, for example, be implemented in the validation device 125 or, depending on the embodiment, implemented by the validation device 125 of the second terminal 12 and via an application previously installed on the second terminal 12. Thus, existing terminals can be made to conform to the second terminal 12 according to the invention by a software modification without it being necessary to intervene physically on the terminal ("hardware"). Furthermore, enhancements can be made by updates to the software. Such applications can be supplied by the third-party entity 3 supplying the service. Preferably, when a decryption is performed by the second terminal 12, the decryption is partial. Thus, the quantity of data transmitted to the server 3 is low and the complete decryption remains centralized on the server 30.

Then, upon the implementation of the operation 1008 of transmission of the second stream 200 to the server 30, the second stream 200 can comprise the second series 201 in an at least partially decrypted form. The transmission can be performed via a secured channel between the second terminal 12 and the server 30. In such embodiments, the quantity of data transmitted from the second terminal 12 to the server 30 is low, which can be particularly desirable, for example when the quantity of data received and/or transmitted impacts on the costs incurred by the second user 2, for example in the context of a cellphone subscription.

In some embodiments, the operation 1009 is implemented by the server 30, after the implementation of the operation 1008 and on reception of the second stream 200 from the second terminal 12. In this case, the second terminal 12 need not have a decryptor. The second stream 200 can comprise, for example, the multimedia content 130 in a raw form, not decrypted, as picked up by the second terminal 12. The second stream 200 comprises capture data of the multimedia content 130. The server 30 comprises a decryptor. In such embodiments, the computation power of the validation device 125 of the second terminal 12 is not used for the decryption and therefore remains available for other uses. Furthermore, the decryptor can be located centrally on the server 30. By centralizing the decryption module on the server 30, coding characteristics of the multimedia content can remain partly secret, accessible only to the third-party entity 3, which increases the complexity of the task of malicious third-parties.

After the operations 1008 and 1009, the operation 1010 is implemented. In the operation 1010, the first series of codes 101 and the second series of codes 201 are compared to one another. The server 30 comprises a comparison module, also called comparison device or comparator. The comparator can take the form of an application or software installed on the server 30. Such a comparator can, for example, be implemented in the server 30 or implemented by the server 30 via an application previously installed on the server 30. In the example described here, the server 30 checks that the level of match of the second series 201 with the first series 101 is above a predefined match threshold value C, for example expressed as a percentage. The threshold value C is selected so as to detect a theoretical match of the codes of the second series 201 and the codes of the first series 101 while taking account of the transmission errors that can occur between the transmission of the first stream 100 to the unit 20, in particular of the second user 2, (operation 1004), and the reception of the second stream 200 (operation 1008) from the second terminal 12, in particular of the first user 1. In other words, the use of a threshold value C lower than 100%, which would correspond to a perfect match, makes it possible to take account of the information losses described above. The threshold value C can be selected to be equal to (100−X) %, in which the value of X is selected as a function of the quality of the communication means implemented, for example proportional to the sum of the percentages of losses through transmission error of each of the transmissions from the transmission of the first stream 100 to the unit 20, in particular of the second user 2, to the reception of the second stream 200 from the second terminal 12, in particular of the first user 1.

When the level of match is sufficient, here above the threshold value C, then an operation 1011 is implemented.

Optionally, the server 30 can implement, for example prior to the operation 1010, a check of the validity of the second series 200 of codes received, for example as a function of pseudo-random generation rules. Even before having identified the transaction and the unit 20 corresponding to the second stream 200 received, an analysis of the codes makes it possible to check whether the codes are compatible with the pseudo-random generation rules implemented on generation of the codes. An incompatibility on the contrary indicates a corruption of the transaction. Security measures can be taken accordingly, in particular the end of the transaction if the latter can be identified afterwards (operation 1020). Thus, security against frauds is further enhanced.

In the example represented in FIG. 2, the operation 1010 is repeated until a sufficient level of match is detected between a first series 101 transmitted (operation 1004) and a second series 201 received (operation 1008). This is particularly advantageous in combination with a continuous operation of the method: when the series of codes is generated substantially continuously, the first stream 100 and the second stream 200 can also be transmitted substantially continuously (in "streaming" mode). A temporary break in the transmission circuit of the series of codes does not interrupt the process.

In some embodiments, when no sufficient match of a second series 201 with a first series 101 is reached, the process can be terminated for the second stream 200 received. Likewise, when no sufficient match of a first series 101 with a second series 201 is reached, the process can be terminated for the corresponding transaction. In the example described here, the transactions initialized at the server 30 (operation 1003) and the second streams 200 received by the server 30 (operation 1008) are no longer associated with one another by the server 3 (subsequent operation 1011). In such cases, the stopping of the iterations of comparisons (operation 1010) and the stopping of the transaction (operations 1003 and 1004) are processed distinctly.

In the operation 1015 represented in FIG. 2, the condition for stopping of the iterations and for terminating of the process can for example be based on a presumed validity time. For example, a timer is launched on reception of the second stream 200 (operation 1008). If the elapsed time exceeds a predetermined duration, then the comparison process (operation 1010) is terminated. The second stream 200 is then disregarded. In this case at least, the server 30 is equipped with a clock. The operation 1015 can also limit the number of iterations, for example by means of an iteration counter. Other conditions can be implemented during the operation 1015. Preferably, an error and/or transaction interruption message is sent in response to the second terminal 12 originating the second stream 200.

Upon the initialization of the transaction by the server 3, a timer can also be launched (operations 1003 and 1004). If the elapsed time exceeds a predetermined duration, then the processes of generation of codes and of transmission of the first stream (100) (operations 1003 and 1004) are terminated. In this case at least, the server 30 is equipped with a clock. Preferably, an error and/or transaction interruption message is sent in response to the unit 20 originating the request (operation 1002). Thus, after initialization of the transaction, the server 3 waits for feedback from a second device 12 (not yet identified) in response to the transaction. In case of absence of a satisfactory response (a second series of codes 201 corresponding to the first series 101), the transaction is terminated (operation 1020).

In the operation 1011, the second terminal 12, the transaction device 20 and the current transaction are associated (in particular, the first user 1, the second user 2, and the current transaction are associated). The server 30 identifies the second terminal 12, in particular the first user 1, as being the client of the transaction device 20, in particular of the second user 2, in the current transaction. Through this association, the server, in particular of the third-party entity 3, can assume the role of trusted intermediary between the second terminal 12 and the transaction device 20, in particular the first user 1 and the second user 2, in the context of the transaction. In order to identify the first user 1, the server 30 can receive an identifier of the first user 1 transmitted by the second terminal 12, for example included in the second data stream 200.

In an operation 1012, the continuation of the transaction is authorized between the second terminal 12 and the transaction device 20, in particular between the first user 1 and the second user 2, via the server 30, and therefore, in particular, the third-party entity 3. In some embodiments, the authorization is implemented by the server 30. The server 30 comprises an authorization device authorizing the continuation of the transaction between the second terminal 12 and the transaction device 20, in particular between the associated first user 1 and second user 2, via the third-party entity 3.

In first embodiments, the operation 1012 of authorization to continue the transaction comprises the transmission of data from the second terminal 12, in particular of the first user 1, to the unit 20, in particular of the second user 2, via the server 30 serving as relay. Thus, the first user 1 can transmit sensitive data, for example bank and/or personal data, without involving the first, potentially unsecured terminal 1.

In second embodiments, the server 30 transmits sensitive data relating to the first user 1 to the unit 20 at least partially automatically. For example, the server 30 can have access to at least some of the sensitive data of the first user 1. The first user 1 may have supplied some of the sensitive data to the third-party entity 3 prior to the transaction, for example upon a subscription to the service by the first user 1. For example, the first user may have supplied the third-party entity with a default delivery address and bank details. Such data are stored on one or more databases accessible to the server 30. The first user 1 may also have given a prior authorization to the server 30 to transmit said data automatically as soon as a transaction is authorized. In this case, the server 30 may be relieved of having to request an additional confirmation from the first user 1 on each transaction. The authorization to continue the transaction can comprise: sending sensitive data relating to the first user 1 to the unit 20, in particular of the second user 2, from the server 30, in particular of the third-party entity 3.

Such embodiments are particularly advantageous when the third-party entity 3 controlling the server 30 is an organization such as a standard banking organization of the first user 1. Often for regulatory reasons, banking organizations have at least some of the banking and personal information relating to the first user 1 available. In such cases, the server 30 can, rather than transmit the banking details to the unit 20, transmit a confirmation of the transaction to the unit 20. The financial exchanges can then be performed a posteriori: the third-party entity 3 then also serves as financial intermediary. For example, the third-party entity 3 can replace the first user 1 as payer with respect to the second user 2 and group together the payments for several transactions of several first users into a single payment, for example with a periodical payment for all of the transactions confirmed during an earlier period. Likewise, the server 30 can bill each first user 1 by grouping together several transactions of one and the same first user 1.

In third embodiments, the server 30 can transmit to the second terminal 12, in particular of the first user 1, a transaction confirmation request. Such a request can comprise, for example, a reference of the transaction, a price corresponding to the transaction and, optionally, requests for additional information from the transaction device, in particular of the second user 2, as has been described above (e-mail, telephone number, etc.) On reception of the confirmation of the transaction from the second terminal 12, in particular of the first user 1, the server 30 can, in turn, transmit a confirmation of the transaction to the unit 20, in particular of the second user 2, optionally accompanied by additional data supplied by the first user 1 via the second terminal 12.

In all the cases, the server 30 can optionally transmit a confirmation of the transaction to the second terminal 12 and, therefore, in particular to the first user 1 via the second terminal 12.

The process is terminated in the operation 1020. The operation 1020 indicates the end of the process, whether the transaction is finally completed or cancelled.

The server 30 can, at any moment, receive a denial of confirmation, or an invalidation, of the transaction from the second terminal 12, in particular of the first user 1 and/or from the transaction device, in particular of the second user 2. In this case, the process is terminated by the operation 1020, optionally after having transmitted transaction cancelation messages to the second terminal 12, in particular of the first user 1 and/or to the transaction device, in particular of the second user 2.

When a transaction is terminated (operation 1020), whatever its outcome, the generation of codes and the transmission of the streams can be stopped. Thus, the first stream 100 is transmitted continuously in response to a request from the transaction device 20 addressed to the server 3, and is interrupted upon closure of the transaction. Closure of the transaction is understood here to mean either a performance or a cancellation of the transaction. The stored codes can be deleted. Thus, the comparisons of the operation 1010 can be limited to the transactions active for associating each second stream 200 received by the server 30 with an active transaction.

A method for securing a transaction initialized between a first communication terminal available to a first user and a transaction device of a second user via a server of a third-party entity comprises: comparing:

a first series of codes transmitted with a first data stream associated with the transaction, from the server of the third-party entity to the transaction device of the second user, the data of the first stream comprising the first series of codes drawn from a private key associated with the second user, and a second series of codes received with a second data stream by the server of the third-party entity from a second communication terminal available to the first user, said second terminal transmitting the second stream in response to the reception of the first stream, the comparison triggering, in case of a match between the two series of codes, associating the first user, the second user and the transaction, making it possible to issue an authorization to continue the transaction between the first user and the second user associated by the third-party entity.

Such a method allows the first user to begin a transaction with the second user, for example an order for an object to be delivered, on the first terminal. The first terminal and/or a part of the network used may not be secured, be badly secured or have a level of security that is not known to the first user. The user can nevertheless prefer to use a computer in an Internet café for better browsing comfort rather than use a smartphone whose screen is smaller ("smartphone" is used here in the sense of a "computer phone"). Thus, the smartphone can be used as second terminal. There is then no need for the user to enter the sensitive data, in particular the banking and personal data, on the first terminal. In other words, the transaction is possible without the sensitive data passing through the first terminal or a portion of a network whose security is unknown.

According to another aspect, the applicant proposes a server of a third-party entity for securing a transaction initialized between a first communication terminal available to a first user and a transaction device of a second user, the server being able to communicate with a second communication terminal available to the first user and with the transaction device of the second user, the server comprising:

a comparator:

of a first series of codes transmitted with a first data stream associated with the transaction, by a transmitter of the server of the third-party entity to the transaction device of the second user, the data of the first stream comprising the first series of codes drawn from a private key associated with the second user, and of a second series of codes received with a second data stream by a receiver of the server of the third-party entity from a second communication terminal available to the first user, said second terminal transmitting the second stream in response to the reception of the first stream, the comparator being capable, in case of a match between the two series of codes, of associating the first user, the second user and the transaction, triggering a device authorizing the continuation of the transaction between the associated first user and second user, via the third-party entity.

According to another aspect, the applicant proposes a method for validating a transaction initialized between a first communication terminal available to a first user and a transaction device of a second user, implemented by a second communication terminal available to the first user. The method comprises: inserting, into a second data stream, a second series of codes in response to a reception of a first series of codes associated with the transaction by the transaction device of the second user in a first data stream originating from a server of a third-party entity, the second series of codes being drawn from a private key associated with the second user, the second stream being able to be transmitted from the second terminal to the server of the third-party entity.

According to another aspect, the applicant proposes a communication terminal that can communicate with a server and comprising a validation device. The validation device comprises: a stream generator inserting, into a second data stream, a second series of codes in response to a reception of a first series of codes associated with the transaction by the transaction device of the second user in a first data stream originating from a server of a third-party entity, the second series of codes being drawn from a private key associated with the second user, the second stream being able to be transmitted by a transmitter of the second terminal to the server of the third-party entity.

According to another aspect, the applicant proposes a computer program comprising instructions for the implementation of one and/or the other of the methods when this program is run by a processor.

The following features can, optionally, be implemented. They can be implemented independently of one another or in combination with one another:

The first stream is transmitted continuously in response to a request from the transaction device addressed to the server, and is interrupted on closure of the transaction. The continuous transmission of the first stream containing the first series of codes makes it possible to repeat the comparison until a sufficient level of match is detected between a transmitted first series and a received second series.

The first series of codes of the first stream takes the form of a multimedia content. Thus, if the second terminal is provided with a sensor, there will be no need to connect the first terminal 11 and the second terminal 12 to one another via a physical or wireless connection for the first user reading the first series of codes received to enter, on his or her second terminal, a second series of codes which will be transmitted in a second stream.

The comparison of the first series of codes and of the second series of codes comprises: checking that the level of match of the second series with the first series is above a match threshold value that is predefined and lower than a 100%. This makes it possible to identify a match between the first and the second series of codes despite transmission errors that may occur between the transmission of the first stream to the transaction device of the second user and the reception of the second stream from the second terminal of the first user.

The first stream and/or the second stream are each transmitted via a secured channel, respectively between the server of the third-party entity and the transaction device of the second user, respectively between the second terminal of the first user and the server of the third-party entity. This additional precaution makes it possible to complicate the attempts of a malicious third party. By sufficiently slowing down the interception and the interpretation of the exchanges by such a third party, it becomes probable that the transaction will be closed before the third party can use the intercepted data. Now, upon closure of the transaction, the data exchanged become unusable.

The authorization to continue the transaction comprises:

sending a transaction confirmation request to the second terminal of the first user from the server of the third-party entity, receiving a confirmation of the transaction on the server of the third-party entity from the second terminal of the first user, sending a confirmation of the transaction to the transaction device of the second user from the server of the third-party entity.

This makes it possible for example to avoid transmitting banking data specific to the first user to the second user. The possible consequences for the first user of poor securing of the data stored and/or exchanged by the second user are limited.

The second stream comprises capture data of a multimedia content via at least one sensor of the second terminal, the second series of codes being included in the capture data of the multimedia content. Thus, if the first terminal receives the first series of codes in a multimedia content that it reproduces, there will be no need to connect the first terminal and the second terminal to one another via a physical or wireless connection for the first user reading the first series of codes received to enter on his or her second terminal a second series of codes which will be transmitted in a second stream.

The validation method further comprises: capturing a multimedia content contained in the first stream, received by the first terminal of the transaction device, and reproduced by the first terminal, the capture being performed via at least one sensor of the second terminal, the multimedia content including the first series of codes. Thus, if the first terminal receives the first series of codes in a multimedia content that it reproduces, there will be no need to connect the first terminal and the second terminal to one another via a physical or wireless connection for the first user reading the first series of codes received to enter on his or her second terminal a second series of codes which will be transmitted in a second stream.

The capture of the multimedia content reproduced by the first terminal comprises at least one of the following operations:

photographing and/or filming, by means of an optical sensor of the second terminal, a display screen of the first terminal displaying a succession of fixed or moving images, or a video;

picking up, by means of a microphone of the second terminal, sound emitted by a loudspeaker of the first terminal.

Optical sensors and microphones are generally present on the known devices available to the users, in particular smartphones. There is then no need for the first user to acquire a terminal or dedicated equipment.

The validation method further comprises, between the capture of the multimedia content and the transmission of the at least one part of the first series of codes, an operation of decryption of the codes contained in the multimedia content captured by the second terminal, the second stream that can be transmitted comprising the second series of codes in decrypted form and drawn from the captured multimedia content. The quantity of data to be transmitted from the second terminal is then reduced.

Depending on the embodiments selected or the combinations of embodiments, some deeds, actions, events or functions of each of the methods and procedures described in the present document can be performed or occur in a different order from that in which they have been described, or can be added, merged or even not be performed or not occur, depending on the case. Furthermore, in some embodiments, some deeds, actions or events are performed or occur concurrently and not in succession.

Unless stipulated otherwise or saving obvious incompatibility, the features of each of the embodiments and variants described above can be implemented together, or separately, or indeed be substituted for one another.

The present description discloses a set of technical possibilities without considerations of regulatory nature. Obviously, the implementation of the invention is adapted to the applicable regulations. Consequently, the present description should not be interrupted as any admission or incitement to fail to observe a regulation, in particular regulations applicable in the banking, finance and tax fields and in the areas of the conservation and the transmission of data.

The invention is not limited to the examples of methods, servers, terminals, systems and programs described above, purely by way of example.

The invention claimed is:

1. A method of data processing for securing a sensitive content exchange initialized between a device and an unsecure first communication terminal used by user in a system comprising the unsecure first communication terminal, a second communication terminal of the user, the device, a server, a secure communication channel linking the server, the device and the second communication terminal, and an unsecure communication channel linked to the unsecure first communication terminal, the method comprising the following acts:

initializing the sensitive content exchange between the unsecure first communication terminal and the device, said initialization including an initialization message transmitted between the unsecure first communication terminal and the device and being exempted from sensitive data belonging to the user being transmitted via the unsecure communication channel, said sensitive data including at least personal data of the user;

receiving an exchange request via the device addressed to the server;

continuously transmitting, in response to the exchange request, a first series of codes associated with the sensitive content exchange in a first data stream from the server to the device, the first series of codes being drawn from a private key associated with the device;

continuously transmitting the first series of codes from the device to the unsecure first communication terminal;

broadcasting multimedia content corresponding to the first series of codes using the unsecure first communication terminal;

capturing the multimedia content displayed by the unsecure first communication terminal using at least one sensor of the second communication terminal;

transmitting a second data stream comprising a second series of codes corresponding to the captured multimedia content from the second communication terminal to the server;

detecting an adequate or an inadequate level of match between the first and second series of codes including comparing the first series of codes to the second series of codes using the server; and securing the sensitive content exchange involving the unsecure first communication terminal in response to the act of detecting including:

when the adequate level of match is detected between the first and second series of codes:

associating the second communication terminal, the device, and the sensitive content exchange using the server in response to the act of detecting; and authorizing a continuation of the sensitive content exchange between the second communication terminal and the device using the server; and when the inadequate level of match is detected, terminating the transmission of the second data stream.

2. The method as claimed in claim 1, wherein the act of detecting an adequate level of match between the first series of codes and of the second series of codes comprises:

checking that a level of match between the first series of codes and the second series of codes is above a match threshold value that is predefined and lower than 100%.

3. The method as claimed in claim 1, wherein the second data stream comprises capture data of the captured multimedia content, the second series of codes being included in the capture data.

4. A non-transitory computer-readable medium comprising a computer program stored thereon comprising instructions, which when executed by a processor of a server, configure a server to perform a method of data processing for securing a sensitive content exchange initialized between an unsecure first communication terminal used by a user and a device, the server, the device and the second communication terminal being linked by a secure communication channel and the unsecure first communication terminal being linked to an unsecure communication channel, wherein the method comprises the following acts:

receiving an exchange request via the device addressed to the server, said exchange request being exempted from sensitive data belonging to the user being transmitted via the unsecure communication channel, said sensitive data including at least personal data of the user;

continuously transmitting, in response to the exchange request, a first series of codes in a first data stream associated with the sensitive content exchange, from the server to the device, the first series of codes being drawn from a private key associated with the device;

receiving a second data stream from the second communication terminal, the second data stream comprising a second series of codes corresponding to a capture of multimedia content broadcast by the unsecure first communication terminal using at least one sensor of the second communication terminal;

detecting an adequate or an inadequate level of match between the first and second series of codes including comparing the first series of codes to the second series of codes; and securing the sensitive content exchange involving the unsecure first communication terminal in response to the act of detecting including:

when the adequate level of match is detected:

associating the second communication terminal, the device, and the sensitive content exchange; and authorizing a continuation of the sensitive content exchange between the second communication terminal and the device; and when the inadequate level of match is detected, terminating the transmission of the second data stream.

5. A server for performing data processing for securing a sensitive content exchange initialized between an unsecure first communication terminal and a device, the server being able to communicate with a second communication terminal available to the first user and with the device, a secure communication channel linking the server to the device and the second communication terminal, and an unsecure communication channel being linked to the unsecure first communication terminal, the server comprising:

a communication channel for receiving an exchange request via the device addressed to the server, said exchange request being exempted from sensitive data belonging to the user being transmitted via the unsecure communication channel, said sensitive data including at least personal data of the user;

a transmitter configured to continuously transmit a first series of codes in a first data stream associated with the sensitive content exchange to the device, the first series of codes drawn from a private key associated with the device; and a receiver configured to receive a second data stream from the second communication terminal, the second data stream comprising a second series of codes corresponding to a capture of multimedia content broadcast by the unsecure first communication terminal using at least one sensor of the second communication terminal; and a comparator configured to compare the first series of codes to the second series of codes and detect an adequate or an inadequate level of match between the first and second series of codes, wherein the server is configured to secure the sensitive content exchange involving the unsecure first communication terminal including:

when the adequate level of match is detected:

associate the second communication terminal, the device and the sensitive content exchange; and authorize a continuation of the sensitive content exchange between the associated second communication terminal and device, such authorization being issued without transmitting sensitive information from the second communication terminal to the unsecure first communication terminal; and when no sufficient match between the first and second series of codes is detected, terminate the transmission of the second data stream.

* * * * *